(12) United States Patent
Heijnen et al.

(10) Patent No.: US 6,955,216 B1
(45) Date of Patent: Oct. 18, 2005

(54) DEVICE FOR INJECTING A FLUID INTO A FORMATION

(75) Inventors: Wilhelmus Hubertus Paulus Maria Heijnen, Velsen (NL); Maria Joao Ramos Correia Morato Pena, Rijswijk (NL)

(73) Assignee: Shell Oil Company, Houston, TX (US)

( * ) Notice: Subject to any disclaimer, the term of this patent is extended or adjusted under 35 U.S.C. 154(b) by 99 days.

(21) Appl. No.: 10/148,040

(22) PCT Filed: Nov. 24, 2000

(86) PCT No.: PCT/EP00/11906

§ 371 (c)(1),
(2), (4) Date: Jul. 8, 2002

(87) PCT Pub. No.: WO01/38691

PCT Pub. Date: May 31, 2001

(30) Foreign Application Priority Data

Nov. 24, 1999 (EP) .............................. 99309377

(51) Int. Cl.[7] ............................................... E21B 27/02
(52) U.S. Cl. ...................... 166/100; 166/101; 166/165; 166/169; 166/185; 166/186
(58) Field of Search ................................ 166/185, 186, 166/127, 305.1, 288, 291, 62, 57, 100, 101, 162, 165, 169

(56) References Cited

U.S. PATENT DOCUMENTS

| | | | | |
|---|---|---|---|---|
| 1,801,983 A | * | 4/1931 | Saye | ........................ 166/288 |
| 1,954,608 A | | 4/1934 | Winter | |
| 2,399,125 A | | 4/1946 | Lehnhard | |
| 2,986,212 A | | 5/1961 | Schultz | |
| 3,199,598 A | * | 8/1965 | Loomis | ...................... 166/165 |
| 4,393,927 A | * | 7/1983 | Singer | ...................... 166/305.1 |
| 4,484,625 A | * | 11/1984 | Barbee, Jr. | .................. 166/185 |
| 5,027,895 A | | 7/1991 | Barton | |
| 6,059,032 A | * | 5/2000 | Jones | ...................... 166/305.1 |

FOREIGN PATENT DOCUMENTS

FR          2 268 939 A     11/1975

* cited by examiner

*Primary Examiner*—David Bagnell
*Assistant Examiner*—Matthew J. Smith

(57) ABSTRACT

A device for injecting a fluid into an earth formation surrounding a wellbore, comprising a body suitable to be arranged in the wellbore and being provided with means for connecting the body to a tubing, a fluid chamber for storage of said fluid, and a pair of inflatable packers arranged to isolate a portion of the wellbore between the packers from the remainder of the wellbore upon inflation of the packers, the body further being provided with an outlet port located between the packers for flow of fluid from the fluid chamber to outside the device, means for inflating the packers upon the occurrence of a primary fluid pressure in the tubing, and means for ejecting fluid from the fluid chamber via the outlet port to outside the device upon the occurrence of a secondary fluid pressure in the tubing, wherein the secondary fluid pressure is higher than the primary fluid pressure.

7 Claims, 1 Drawing Sheet

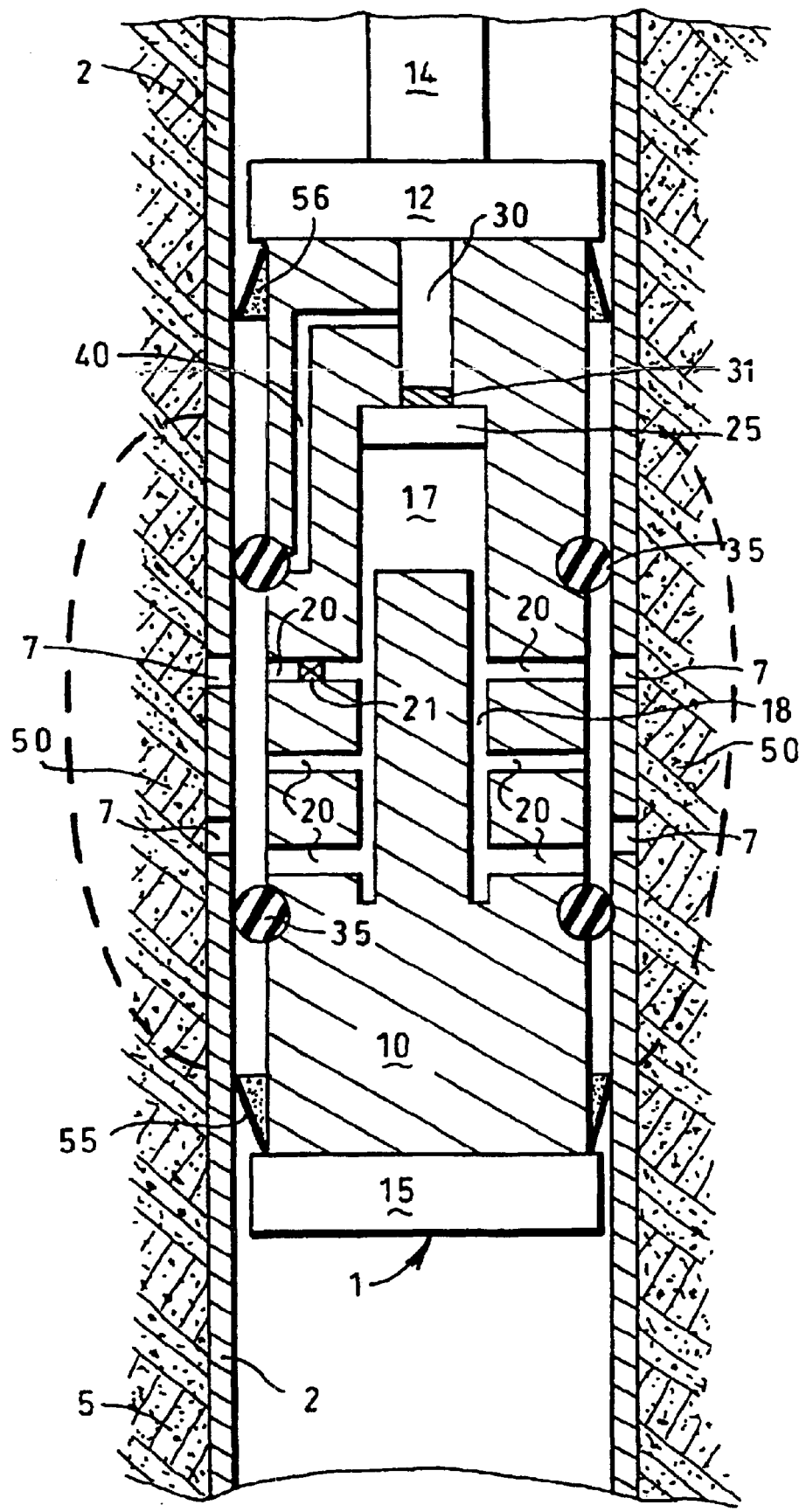

DEVICE FOR INJECTING A FLUID INTO A FORMATION

BACKGROUND OF THE INVENTION

Field of the Invention

The present invention relates to a device for injecting a fluid into an earth formation surrounding a wellbore. For example, such injection is desirable in order to seal-off a formation, or a natural or induced fracture in a formation, around a perforated well tubular in the wellbore. Such a well tubular can be a casing or a liner, and the well tubular is perforated in the so-called pay zone from which hydrocarbons are recovered.

In order to manage production it is sometimes required to interrupt production from the formation. To this end an annular seal can be set, which is set in the interior of the well tubular so as to cover the perforations in the well tubular. However, such an annular seal has an inner diameter that is smaller than the inner diameter of the well tubular, and it thus forms a limitation on the diameter of tools that may have to pass through the well tubular.

It is also sometimes required to isolate the wellbore from a formation layer that contains undesirable fluids, such as water. In this way the co-production of such fluids can be reduced.

It is an object of the present invention to provide a device that enables injection of a fluid into the formation around the wellbore.

Summary of the Invention

In accordance with the invention there is provided a device for injecting a fluid into an earth formation surrounding a wellbore, comprising a body suitable to be arranged in the wellbore and being provided with means for connecting the body to a tubing, a fluid chamber for storage of said fluid, and a pair of inflatable packers arranged to isolate a portion of the wellbore between the packers from the remainder of the wellbore upon inflation of the packers, the body further being provided with an outlet port located between the packers for flow of fluid from the fluid chamber to outside the device, means for inflating the packers upon the occurrence of a primary fluid pressure in the tubing, and means for ejecting fluid from the fluid chamber via the outlet port to outside the device upon the occurrence of a secondary fluid pressure in the tubing, wherein the secondary fluid pressure is higher than the primary fluid pressure.

It is thereby achieved that upon application of the primary pressure in the tubing first the packers are inflated, and that thereafter the fluid is injected into the formation upon a further increase of the pressure to the secondary pressure.

Suitably the means for inflating the packers comprises a first conduit system providing fluid communication between the tubing and the packers.

It is preferred that the means for ejecting fluid from the fluid chamber comprises a second conduit system providing fluid communication between the tubing and the fluid chamber, the second conduit system being provided with a shear disk which shears at the occurrence of the secondary pressure in the tubing and which prevents said fluid communication between the tubing and the fluid chamber prior to shearing.

Advantageously the second conduit system is further provided with a free floating piston separating the fluid chamber from the tubing.

BRIEF DESCRIPTION OF THE DRAWING

The invention will now be described in more detail with reference to the accompanying drawing showing schematically a partial longitudinal section of the device 1 according to the present invention.

DETAILED DESCRIPTION OF THE INVENTION

The device 1 is located in a well tubular in the form of a liner 2 arranged in a wellbore in an underground formation 5. The liner 2 is provided with perforations 7. Normally hydrocarbons are recovered from the underground formation 5 through the perforations 7 and passed to surface through the well tubular.

However, it is now required that recovery is interrupted. In order to interrupt recovery, the device 1 according to the present invention is run into the liner 2.

The device 1 comprises a hollow body 10 having at its upper end means 12 for connecting the device 1 to the lower end of a tubing 14. The lower end of the hollow body comprises an end cap 15.

The hollow body 10 is provided with a cavity 17 for storing a flowable sealant composition (not shown), for example a rubber composition. The cavity 17 has an outlet 18 that is in fluid communication with a number of outlet ports 20 in the side wall of the hollow body 10. Each outlet port 20 is closed by means of a shear disk 21. For the sake of clarity, only one shear disk 21 has been shown.

The hollow body 10 further comprises a free-floating piston 25 arranged in the cavity 17. The upper end part of the device is provided with an inlet 30 that opens into the cavity 17. The inlet 30 is closed at its lower end by means of a shear disk 31, and the inlet 30 has an opening at its upper end that is in fluid communication with the interior of the tubing 14.

The device 1 further comprises a pair of inflatable packers 35 arranged on either side of the outlet ports 20, and a conduit system 40 for inflating the packers 35 communicating with the inlet 30 of the device 1 upstream of the shear disk 31.

During normal operation, the device 1 is lowered at the lower end of the tubing 14 into the well tubular 2 to a position where fluid flow through the perforations 7 has to be stopped. In this running position, the cavity 17 is filled with a rubber composition, and the tubing 14 and the inlet 30 are filled with liquid, such as water. In order to activate the device 1, a first pressure is exerted on the liquid in the tubing 14 and the inlet 30. The first pressure is so selected that the inflatable packers 35 are inflated, but that the shear disk 31 does not fail.

Once the packers 35 have been set, the pressure on the liquid is increased in order to rupture the shear disk 31, and the piston 25 is forced downwardly, the rubber composition is forced out of the cavity 17, and ruptures the shear disks 21 in the outlet ports 20. Via the perforations 7, the rubber composition enters into the formation 5, and the rubber-filled formation region is referred to with reference numeral 50.

Having forced the rubber composition into the formation 5, the device 1 is removed from the well tubular 2.

These steps can be repeated to improve the quality of the seal.

Suitably the device 1 is provided with a set of scrapers 55 and 56 to remove rubber from the interior of the well tubular 2 when the device 1 is pulled out of the well tubular 2. The scrapers 55 and 56 are arranged at either end of the hollow body 10.

The tubing 14 can be any suitable tubular, for example a production tubing, a drill string or a coil tubing.

The sealant composition can consist of any suitable material, such as a vulcanized or unvulcanized rubber composition. The unvulcanized rubber can be so selected that it vulcanizes when heat is applied. The heat can come from the formation or from an external heater (not shown).

The device according to the present invention can suitably be used to shut off natural or induced fractures in an underground formation. Moreover, it can be used to shut off holes or weak points in the well tubular. In addition, because the annular space between the outside of the perforated well tubular and the borehole is filled with the sealant composition, the sealant composition acts as a packer in the annulus for holding the well tubular.

What is claimed is:

1. A device for injecting a fluid into an earth formation surrounding a wellbore, comprising a body suitable to be arranged in the wellbore and being provided with means for connecting the body to a tubing, a fluid chamber for storage of said fluid, and a pair of inflatable packers arranged to isolate a portion of the wellbore between the packers from the remainder of the wellbore upon inflation of the packers, the body further being provided with an outlet port located between the packers for flow of fluid from the fluid chamber to outside the device, means for inflating the packers upon the occurrence of a primary fluid pressure in the tubing, and means for ejecting fluid from the fluid chamber via the outlet port to outside the device upon the occurrence of a secondary fluid pressure in the tubing, wherein the secondary fluid pressure is higher than the primary fluid pressure and wherein the means for inflating the packers comprises a first conduit system providing fluid communication between the tubing and the packers, wherein the means for ejecting fluid from the fluid chamber comprises a second conduit system providing fluid communication between the tubing and the fluid chamber, the second conduit system being provided with a shear disk which shears at the occurence of the secondary pressure in the tubing and which prevents said fluid communication between the tubing and the fluid chamber prior to shearing.

2. The device of claim 1, wherein the second conduit system is further provided with a free floating piston separating the fluid chamber from the tubing.

3. The device of claim 1, wherein the outlet port is provided with a secondary shear disk.

4. The device of claim 1, wherein the body is provided with a plurality of said outlet ports.

5. The device of claim 1, wherein the fluid chamber contains a sealant composition for sealing-off the earth formation.

6. The device according to claim 5, wherein the sealant composition comprises a rubber that vulcanizes when heat is supplied.

7. The device of claim 1, further comprising a set of scrapers arranged at either end of the body.

* * * * *